(12) United States Patent
Brown et al.

(10) Patent No.: US 8,620,578 B1
(45) Date of Patent: Dec. 31, 2013

(54) CENTRALIZED LOCATION STORAGE SYSTEM AND METHOD

(75) Inventors: James W. Brown, Flitton (GB); Nicholas J. A. Black, London (GB); Cragg E. Nilson, New Malden (GB)

(73) Assignee: Cloudmade, Ltd., London (GB)

( * ) Notice: Subject to any disclaimer, the term of this patent is extended or adjusted under 35 U.S.C. 154(b) by 179 days.

(21) Appl. No.: 12/803,317

(22) Filed: Jun. 23, 2010

Related U.S. Application Data

(60) Provisional application No. 61/269,473, filed on Jun. 24, 2009, provisional application No. 61/279,178, filed on Oct. 16, 2009.

(51) Int. Cl.
*G01C 21/26* (2006.01)

(52) U.S. Cl.
USPC ........... 701/425; 701/400; 701/426; 701/430; 701/438

(58) Field of Classification Search
USPC .................. 701/200, 400, 425, 426, 430, 438
See application file for complete search history.

(56) References Cited

U.S. PATENT DOCUMENTS

2009/0299824 A1 * 12/2009 Barnes, Jr. ...................... 705/10

FOREIGN PATENT DOCUMENTS

WO   WO 0189183 A1 * 11/2001

OTHER PUBLICATIONS

18721255 PRNS20090107CLW007: PRNewswire, Toyota Motor Sales, U.S.A., Announces Dual-Brand Telematics Programs: Lexus Enform(TM) and Safety Connect(TM) Available in 2009. pp. 2-3.*

* cited by examiner

*Primary Examiner* — Fadey Jabr
*Assistant Examiner* — Yazan A Soofi
(74) *Attorney, Agent, or Firm* — Lessani Law Group, PC

(57) ABSTRACT

The present invention provides a system and method that enables a user to save locations (e.g., addresses, landmarks, etc.) to a central storage location system from within third party applications and then automatically have access to saved location information on registered, client devices, including navigational devices. Third party applications send saved locations, as well as information identifying the applicable users, to a central storage location system. The central storage location system stores location information associated with each saved location in a database (e.g., address and corresponding geocodes). Each location is saved in association with a unique ID corresponding to the user that saved the location. The central storage location system provides each saved location to registered client devices associated with the user that saved the location.

20 Claims, 2 Drawing Sheets

CENTRALIZED LOCATION STORAGE SYSTEM AND METHOD

RELATED APPLICATIONS

This application claims the benefit of U.S. Provisional Application No. 61/269,473, filed on Jun. 24, 2009 with inventors James W. Brown, Nicholas J. A. Black, and Cragg E. Nilson, and titled "Central Location Storage System and Method," the contents of which are incorporated by reference as if fully disclosed herein.

This application also claims the benefit of U.S. Provisional Application No. 61/279,178, filed on Oct. 16, 2009 with inventors Christian O. Peterson and Cragg Nilson, and titled "Location Management System and Method," the contents of which are incorporated by reference as if fully disclosed herein.

BACKGROUND OF THE INVENTION

1. Field of the Invention

This invention relates generally to geographical map data, and, more specifically, to location storage system that stores locations (e.g., addresses) saved by users via third party applications so that they can later be accessed from one or more different client devices.

2. Description of the Background Art

Automobile navigations systems and phones with GPS systems, as well as other navigation devices, provide users with directions from a current location to a specified location. Currently, a user must enter an address into each navigation device that he uses in order to obtain directions. The map website www.maps.google.com enables a user to send map data to a navigation system, but user must manually do so through such website.

Consequently, there is a need for a system and method that enables a user to save locations from within non-mapping third party applications and automatically have access to saved location information on the user's devices (such, as for example, the user's mobile phone and auto navigation system).

SUMMARY OF THE INVENTION

The present invention provides a system and method that enables a user to save locations (e.g., addresses, business names, landmarks, etc.) to a central storage location from within third party applications and then automatically see saved location information on registered client devices, including navigational devices. Third party applications can include non-map related applications.

A third party application may have a button, link, or other means via which a user can click to save a location. In response to a user saving a location, the third party application sends the saved location, as well as information identifying the user, to a central storage location system. The central storage location system stores location information associated with the saved location in a database (e.g., address and corresponding geocodes). The location information is stored in association with a unique ID corresponding to the user. The central storage location system then provides the location information to registered client devices that are associated with the user. In other words, by the user saving the location on the third party website, such location is automatically downloaded to all the user's registered devices without further action required of the user.

The information stored by the central location storage system and provided to client devices may include geocodes for the saved location. The central location storage system also can be configured to store additional information in associated with the location, such as users' comments/reviews on a location, promotions associated with a location, additional facts about the location, etc. As an example, such information may be obtained from mapping systems, advertisement systems, and various web services.

DETAILED DESCRIPTION OF THE PREFERRED EMBODIMENTS

As stated above, the present invention provides a system and method that enables a user to save locations (e.g., addresses, business names, landmarks etc.) to a central storage location from within third party applications and then automatically have access to saved location information from registered client devices, including navigation devices. For example, the present invention would enable a user to (i) view restaurant information from a restaurant website, (ii) save, from within such website, the restaurant location to a centralized location storage system, and (iii) subsequently select such location on the user's car navigation system, wherein the location is automatically downloaded to the car navigation system when the user starts his car. With one "click" on the navigation system screen in his car, the user is able to obtain a route to the restaurant. The restaurant location also may be sent automatically to the user's mobile phone, and, when the user parks, he can then use his mobile phone to obtain directions from his parked car to the restaurant, preferably with one "click" on behalf of the user.

Figure 1:
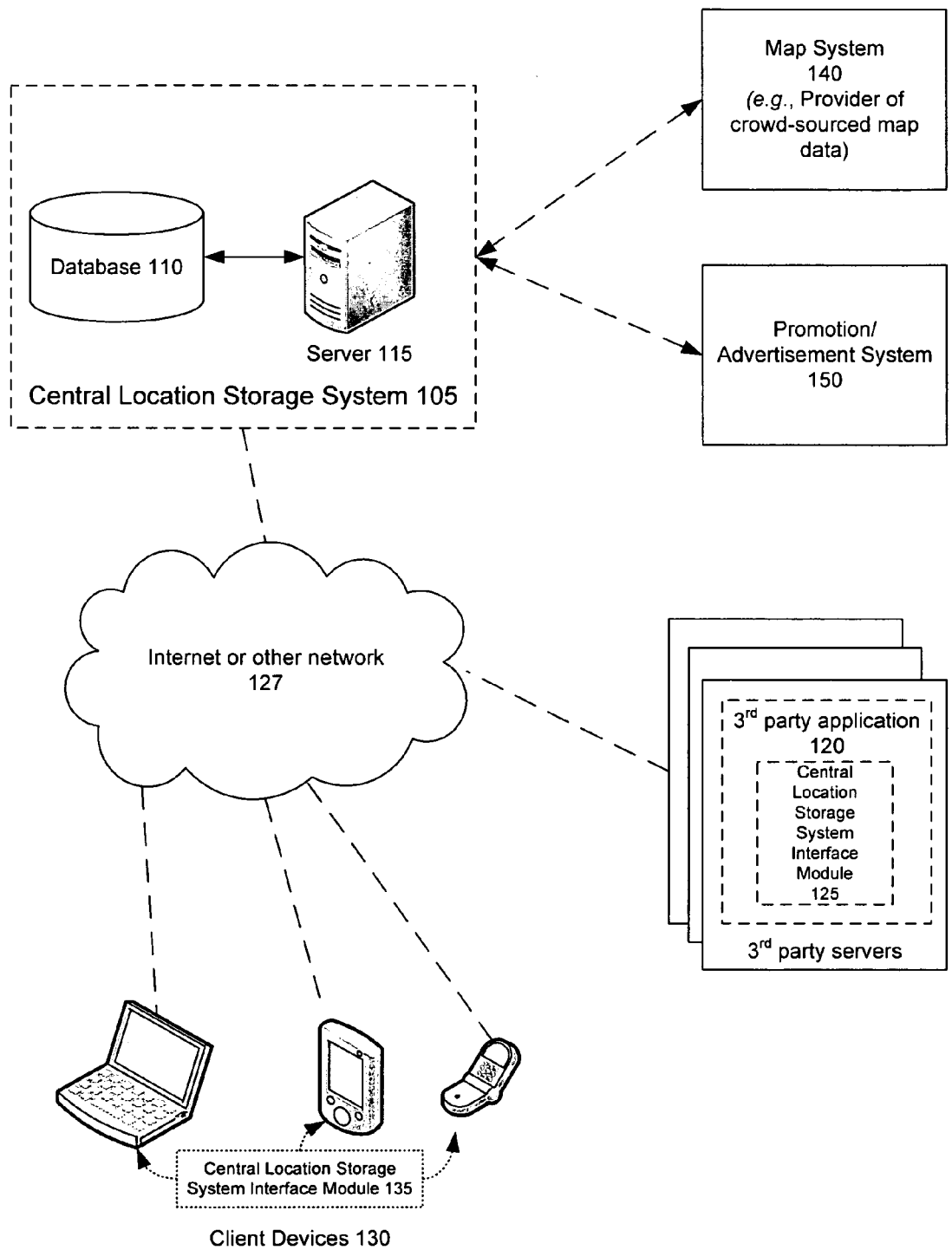
FIG. 1 is a block diagram that illustrates an example network in which the present invention can be implemented.

FIG. 1 illustrates an example network in which the present invention can be implemented. Network 100 includes a Central Location Storage System 105. The Central Location Storage System 105 includes one or more databases 110 and one or more servers 115. Database 110 stores a user's saved locations in association with a unique user ID for the user. Server(s) 115 stores and retrieves information in database 110. In one embodiment, one or more of servers 115 act as a web service provider that responds to web-based requests to store and retrieve locations from database 110.

Central Location Storage System 105 may be a stand-alone system or it may be part of a larger system, such as a mobile phone communication carrier's network. Also, it may be part of a mapping system, such as the mapping system described in U.S. Provisional Application Nos. 61/203,174 (filed on Dec. 19, 2008) and 61/203,225 (filed on Dec. 18, 2009), the contents of which are incorporated by reference herein as if fully disclosed herein. In one embodiment, a mobile phone communication carrier has a Central Location Storage System 105 in its network for its subscribers, and such Central Location Storage System synchronizes with a master Central Location Storage System associated with a mapping system.

In one embodiment, the Central Location Storage System 105 communicates with a map system 140 that has access to map data, such as geocodes. When a user saves a location, the Central Location Storage System 105 retrieves map data associated with the location from the map system 140. In such embodiment, the Central Location Storage System 105 stores the map data for a saved location in association with address and other information for the location. In the preferred embodiment, the map data is crowd-sourced map data, such as map data available from http://maps.cloudmade.com or http://www.openstreetmap.org.

In a further embodiment, the Central Location Storage System also communicates with an advertisement/promotion system 150 to retrieve advertisement/promotions associated with locations saved or visited by the user, wherein the Central Location Storage System 105 provides advertisement/promotion information to registered client devices (i.e., provisioned client devices) in addition to the saved locations.

Network 100 includes third party applications 120. In network 100, third party applications 120 are applications through which users can save locations to the Central Location Storage System 105. Third party applications can include applications that are primarily dedicated to functions other than providing mapping services. Third party applications 120 may be desktop applications, web-browser-based applications, or website applications.

A third party application may display a button or link that a user can select to save a location. A third party application may have an interface module 125 (such as a "plug-in" application module) that enables the application to interface with the Central Location Storage Server 105. For the example, the third party application may be a website application, such as, for example, www.yelp.com, or www.opentable.com, that includes a "plug in" software module that enables the website application to (i) display a link or button that enables a user to save a location and (ii) communicate with the Central Location Storage System 105. The interface module may also have code that causes the third party application to prompt the user for login information for the Central Location Storage System 105.

Registered client devices 130 communicate with the Central Location Storage System 105 via the Internet 127 or other applicable network (e.g., mobile phone carrier's network). Registered client devices 130 may include, but are not limited, to computers, mobile phones, personal digital assistants (PDAs), automobile navigation systems, and handheld GPS systems. In one embodiment, clients device 130 run a software application or module 135 that enables the client devices 130 to communicate with (e.g., synchronize location information) the Central Location Storage System 105. Generalized software for synchronizing data is well known in the art. The user may access the third party applications 120 through one or more of the client devices 130 (e.g., computer, mobile phone).

In one embodiment, in order for a client device to automatically receive or download a user's saved locations in the Central Location Storage System 105, a user must register or provision such client device to his account in the Central Location Storage System 105. The client device may have a user interface through which a user can provision the device and enter information that uniquely identifies the user. For example, in one embodiment, the client device prompts the user for a mobile phone number and an SMS code. After the user enters his mobile phone number (which serves as a unique identifier for the user), Central Location Storage System sends an SMS code to the user's mobile phone to ensure that the phone number entered by the user is for his phone. The user then enters the SMS code to provision the device. If a client device is successfully provisioned, the Central Location Storage System associates identification information for the requesting device (e.g., an IP address) with the user's account.

Figure 2:
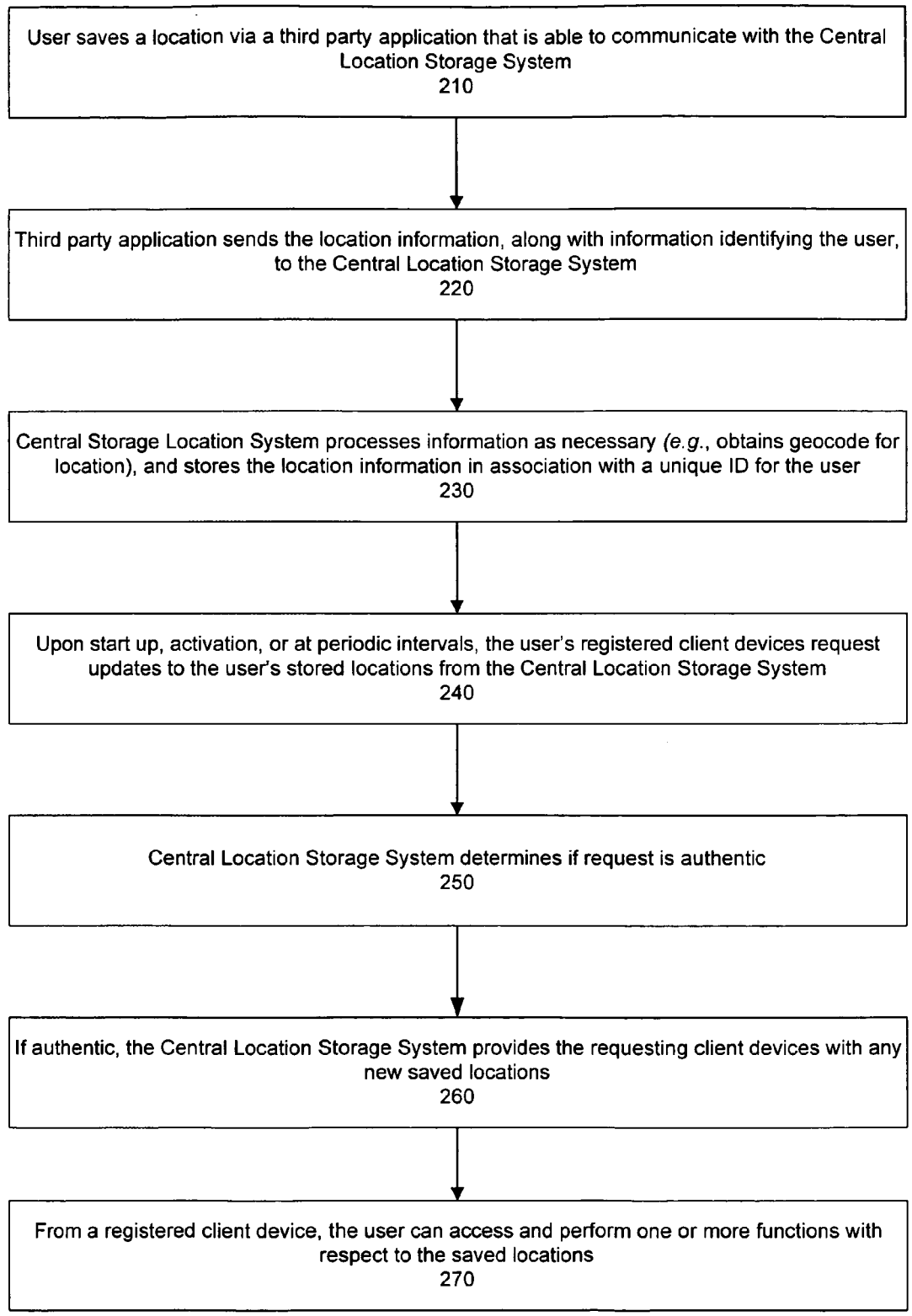
FIG. 2 is a flowchart that illustrates a method for enabling a user to save a location from within a third party application and automatically access saved location information on one or more client devices.

FIG. 2 illustrates a method of the present invention according to one embodiment. A user saves a location via a third party application that is able to communicate with the Central Location Storage System (step 210). In one embodiment, the third party application has a button or link that a user can select to save a location. When the user selects the button, the user may have to enter login information associated with the user's account in the Central Location Storage System, such as a user name and password, or a phone number. Alternatively, if the third party application is a website, there may be a cookie, associated with the user's use of the website, that includes the user's login information or unique ID for the user in the Central Location Storage System. Such cookie enables the user to save a location with one click. Also, if the user logged into the third party application, then the third party application may store a unique ID or login for the user for the Central Location Storage System, and, in such case, the user is able save a location with one click. If the third party application is an email application that can identify addresses, then the user may be able to right click on an identified address to save the address to the user's account in the Central Location Storage System.

In one embodiment, if the user does not have an account with the Central Location Storage System, the user can establishes a new account with the Central Location Storage System through the third party application.

In response to the user entering a command to save a location to the user's account in the Central Location Storage System, the third party application sends the location (e.g., a business name and address, just an address, a landmark, etc.), along with information that uniquely identifies the user (e.g., the user's login data for the Central Location Storage System), to the Central Location Storage System (step 220).

The Central Location Storage System then processes the received information as necessary and stores the location in association with a unique user ID in database 110 (step 230). In one embodiment, the Central Location Storage System obtains a geocode for the location from the Mapping System 140 and stores the geocode along with address information and business name (if applicable). The Central Location Storage System may also store additional information in association with the saved location (e.g., user comments associated with the location, promotion information associated with location, etc.). Such information can be obtained from mapping systems, advertisement systems, web services, and other services/systems. In one embodiment, software running on one or more servers in the Central Location System performs steps 230, 250 and 260 in FIG. 2.

Upon start up, activation, or at periodic intervals, the user's registered client devices (i.e., provisioned client devices) request updates to the user's stored location from the Central Location Storage System (step 240). In one embodiment, interface software module 135 executing on registered client devices 130 enables communications with the Central Location Storage System 105. The module 135 may be configured to periodically request new location/advertisement information (i.e., "pull updates") when the client device is online (i.e., able to connect to the Internet or other applicable network). In one embodiment, the request includes a location ID of the last location received at the client device so that Central Location Storage System can identify the new locations that need to be sent. Instead of a "pull" model, the module 135 may be configured to maintain a connection with server 115 when the client device is online, thereby enabling the server to "push" location or advertisement updates in real-time to the client device.

In response to receiving a location update request from a client device, the Central Location Storage System determines if the request is an authentic request from a device provisioned to a user's account (step 250). If the Central Location Storage System is able to authenticate the client device, the system provides the client device with any new location information (including any associated advertisement/promotion data) saved since the last update (step 260).

From a registered client device, the user can access and perform one or more functions with respect to the saved map locations (step 270). For example, a user may be able to:

Look at a map with a saved location

Search for a saved location

Obtain routing to a saved location

Call a phone number associated with the location

Send the location to another user, where the user can send comments along with the location.

See promotions, advertisements, or other information associated with location or a related location.

View comments about the location from other users linked to the user (e.g., "family and friends" of "FAV 5" in the user's mobile phone carrier network). In such embodiment, the Central Location Storage System searches database 110 to determine whether the linked users have saved any comments for the location. If so, the Central Location Storage System sends such comments to the client device.

In one embodiment, a user's last saved location is displayed in a navigation/mapping application interface on the client device, and a user can, with one click (or "touch"), obtain a route to the saved location.

In a further embodiment of the invention, the user's registered client navigation devices provide the Central Location Storage System with the locations visited by the user (with permission from the user). Consequently, the Central Location Storage System can identify the locations most frequented by the user. Such information is stored along with the user's unique ID and can be used to provide promotions or other information to the user.

As will be understood by those familiar with the art, the foregoing invention may be embodied in other specific forms without departing from the spirit or essential characteristics thereof. Accordingly, the above disclosure of the present invention is intended to be illustrative and not limiting of the invention.

The invention claimed is:

1. A method for enabling a user to save a location from within a third party application and automatically have access to saved location information from one or more client devices, the method comprising:

enabling a user to save a location to a remote location storage system from within a third party application executing on a computer, wherein the remote location storage system is an open system capable of communicating with and receiving location information from a plurality of different third party applications and wherein a third party application is an application in which content in the application is primarily provided by a third party unrelated to the remote location storage system;

in response to a user saving a location, sending the saved location and identifying information for the user from the third party application to the location storage system;

receiving the identifying information and the saved location at the location storage system;

storing location information related to the saved location at the location storage system, wherein such location information is stored in association with a unique ID for the user; and providing the location information to user client devices that are registered with location storage system.

2. The method of claim 1, further comprising:

in response to receiving the user's saved location, obtaining geocode information for the saved location, wherein the location information stored and provided to registered user client devices includes the geocode information.

3. The method of claim 1, further comprising:

in response to receiving the user's saved location, obtaining advertisements based on the saved location from an advertisement system;

storing such advertisement data in association with the user's unique ID and the location information; and providing such advertisement data to one or more of the user's client devices.

4. The method of claim 1, wherein the user's registered client devices periodically poll the location storage system for new saved locations.

5. The method of claim 1, wherein the location storage system pushes the saved location to the user's registered client devices.

6. The method of claim 1, further comprising enabling a user to obtain directions to the saved location on the user's registered client devices.

7. The method of claim 1, wherein when the user elects to save a location from within the third party application, the user is prompted to either enter login information for an existing account with the location storage system or to create a new account with the location storage system.

8. The method of claim 1, wherein the location storage system requires login information in order to store a user's saved location, and login information for the user is stored in a cookie associated with the user's use of the third party application.

9. The method of claim 8, wherein, when the user elects to save a location from within the third party application, the third party application extracts the login information from the cookie.

10. A system for enabling a user to save a location from within a third party application and automatically have access to saved location information from one or more client devices, the system comprising:

a location storage system; and a computer running a third party application that has an interface module that is capable of communicating with the location storage system, wherein:

the third party application enables a user to save a location to the location storage system from within the third party application, wherein the location storage system is an open system capable of communicating with and receiving location information from a plurality of different third party applications and wherein a third party application is an application in which content in the application is primarily provided by a third party unrelated to the location storage system;

in response to the user saving a location, the third party application provides the saved location and identifying information for the user to the location storage system;

the location storage system stores location information related to the saved location in association with a unique ID for the user; and the location storage system provides the location information to user client devices that are registered with central location system.

11. The system of claim 10, wherein:

in response to the location storage system receiving the user's saved location, the location storage system obtains geocode information for the saved location and provides such geocode information to the user's registered client devices.

12. The system of claim 11, wherein the geocode information is obtained from a mapping system.

13. The system of claim 12, wherein:

in response to the location storage system receiving the user's saved location, the location storage system obtains advertisement data based on the saved location from an advertisement system and provide such advertisement data to one or more of the user's client devices.

14. The method of claim 1, wherein the location storage system provides the location information to a user's registered client device in response to a request from the client device.

15. The system of claim 10, wherein the location storage system pushes the location information to the user's registered client devices.

16. The system of claim 10, wherein when the user elects to save a location from within the third party application, the third party application prompts the user to either enter login information for an existing account with the location storage system or to create a new account with the location storage system.

17. The system of claim 10, wherein the location storage system requires login information in order to store a user's saved location, and login information for the user is stored in a cookie associated with the user's use of the third party application.

18. The system of claim 17, wherein, when the user elects to save a location from within the third party application, the third party application extracts the login information from the cookie.

19. A computer program embodied on one or more non-transitory computer-readable mediums and comprising code that when executed by a computer system, enables the computer system to perform the following method for enabling a user to save a location from within a third party application and automatically have access to saved location information from one or more client devices, the method comprising:

enabling a user to save a location to a remote location storage system from within a third party application executing on a computer, wherein the remote location storage system is an open system capable of communicating with and receiving location information from a plurality of different third party applications and wherein a third party application is an application in which content in the application is primarily provided by a third party unrelated to the remote location storage system;

in response to a user saving a location, sending the saved location and identifying information for the user from the third party application to the location storage system;

receiving the identifying information and the saved location at the location storage system;

storing location information related to the saved location at the location storage system, wherein such location information is stored in association with a unique ID for the user; and providing the location information to user client devices that are registered with location storage system.

20. The computer program of claim 19, further comprising:

in response to receiving the user's saved location, obtaining advertisements based on the saved location from an advertisement system;

storing such advertisement data in association with the user's unique ID and the location information; and providing such advertisement data to one or more of the user's client devices.

* * * * *